US005708587A

United States Patent [19]

Franck et al.

[11] Patent Number: 5,708,587

[45] Date of Patent: Jan. 13, 1998

[54] MICROWAVE/OPTICAL TRANSFORMATION METHOD

[75] Inventors: Charmaine C. Franck; Jerome B. Franck, both of Washington, D.C.; Angus McLeod, Tucson, Ariz.

[73] Assignee: The United States of America as represented by the Secretary of the Air Force, Washington, D.C.

[21] Appl. No.: 394,125

[22] Filed: Feb. 24, 1995

Related U.S. Application Data

[63] Continuation-in-part of Ser. No. 911,633, Jul. 10, 1992, abandoned.

[51] Int. Cl.[6] .................. G06F 17/50

[52] U.S. Cl. .................. 364/488

[58] Field of Search .................. 364/488, 489, 364/490, 491, 482; 333/17.3, 32, 35

[56] References Cited

PUBLICATIONS

Chen, "Transmission Line & Microwave Circuit Design using Dragon Wave", Proc. Frontiers in Education, 1991, p. 759.

Dearholt et al., *Electromagnetic Wave Propagation*, McGraw-Hill, Inc., 1973, pp. 299–327.

Koo et al., "Optimum Combination of Series & Parallel Immittances for Broadband Lossy Match Amplifier", China 1991 Int 3 1 Conf. on Ckts. & Sys., pp. 482–485.

MacLeod, *Thin-Film Optical Filters*, Macmillan Publishing Company, pp. 54–57, 62–67, (no date).

Zhu et al., "Mixed Lumped & Distributed Network Applied to Superconducting Thin-Film Broadband Impedance Transforming," 1991 IEEE MTT-S Digest, pp. 635–638.

Compton et al., "An Alternative Approach for Designing Microwave Circuits Using a Personal Computer," A P-S Int'l Symposium 1988, pp. 6–9.

Smilowitz, "Development of a Microwave Design Program for Undergraduate Engineering," 1989 IEEE Frontiers in Education Conference Proceedings, pp. 158–163.

*Primary Examiner*—Kevin J. Teska
*Assistant Examiner*—Leigh Marie Garbowski
*Attorney, Agent, or Firm*—William G. Auton

[57] ABSTRACT

A method to design and analyze distributed microwave circuit elements is presented for design work, the invention can be used to match impedance between microwave circuit elements, and in the design of filters can specifically be used for, but is not limited to the design of microwave stripline or microstrip equivalent elements. This method adapts an optical design tool known as the Optical Admittance Diagram (OAD) for the analysis and design of microwave circuits and/or components (MC), such as microstrip, stripline etc. by: defining the physical MC in terms of equivalent which is transformed into an equivalent continuous transmission line known as a microwave transformer circuit which is made up quarter wave segments which are then transformed (by defining impedances as normalized optical admittances) into equivalent quarter wave optical thin film layers which make up a stack (EOTFS) whose characteristic design parameters and performances are determined by observing the plotted EOTFS on the OAD and then modifying plotted values to achieve the desired characteristic design parameters and then; performing a reverse transformation by transforming said EOTFS back into säid equivalent microwave transformer (made up of said series impedance quarter wave segments) which is then transformed into parallel components as necessary to transform back into the MC which is then; physically constructed using automatic photoetching techniques and machining techniques for fabrication of aluminum plates to house the photo-etched circuit and connectors for testing on a microwave network analyzer to verify design results.

4 Claims, 11 Drawing Sheets

MICROWAVE / OPTICAL TRANSFORMATION METHOD
BLOCK DIAGRAM

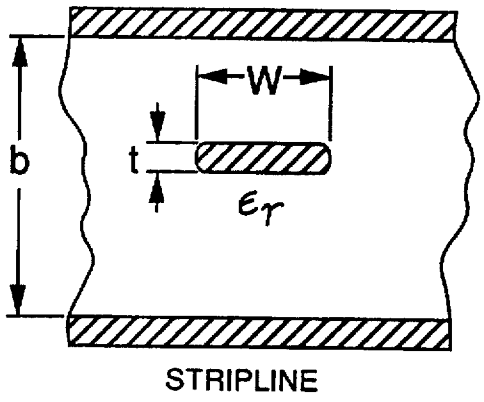
FIG. 1(a)
PRIOR ART
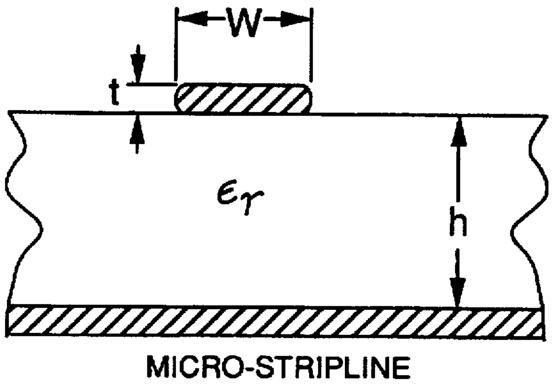
FIG. 1(b)
PRIOR ART
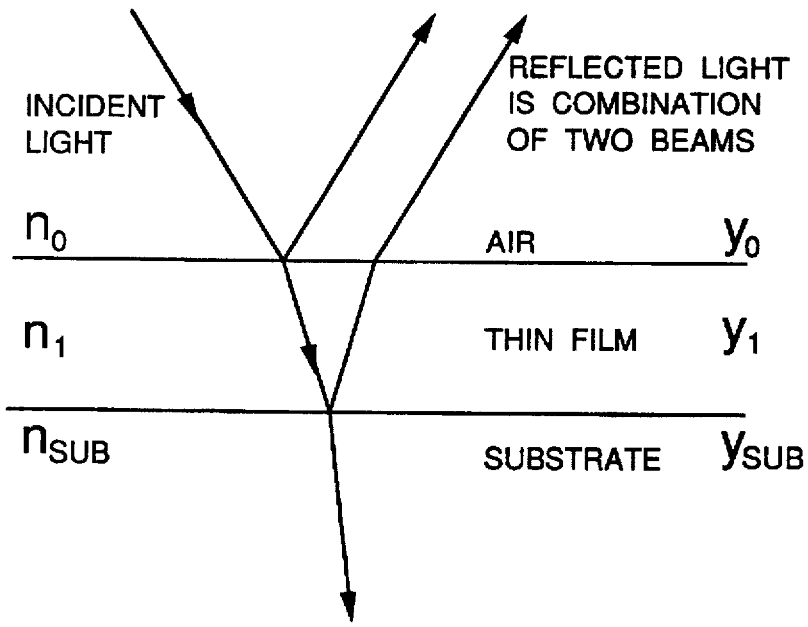
FIG. 2
PRIOR ART
FIG. 3
PRIOR ART
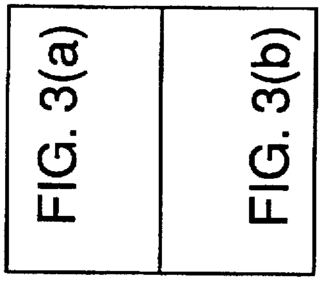

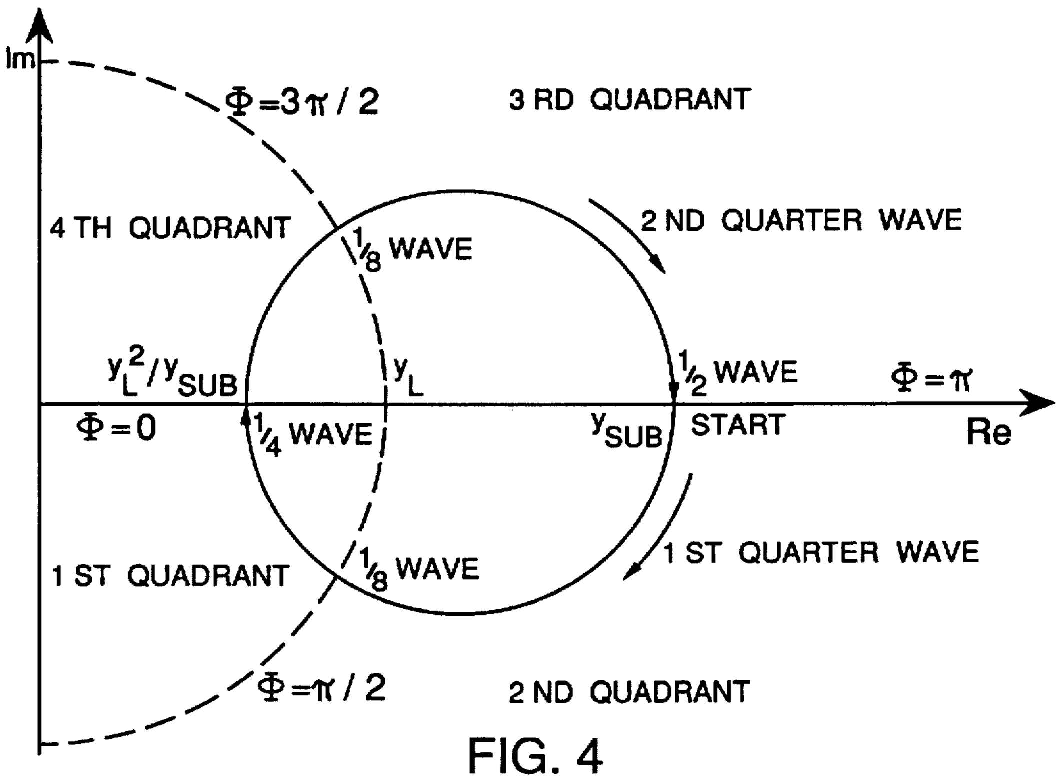
FIG. 4
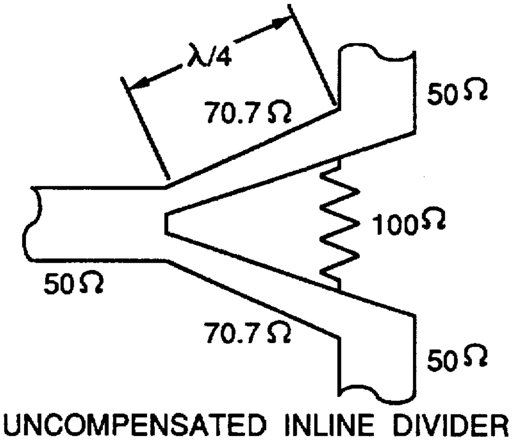
UNCOMPENSATED INLINE DIVIDER
FIG. 5(a)
PRIOR ART
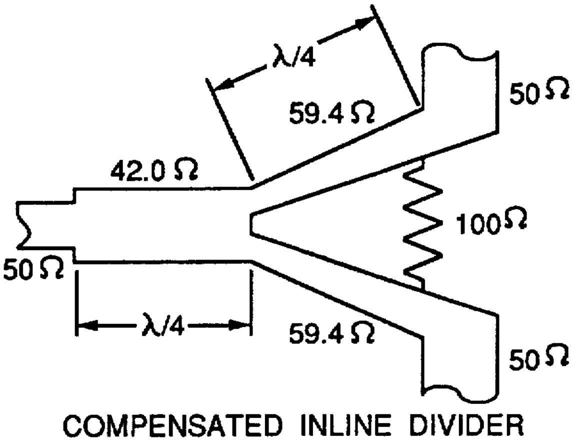
COMPENSATED INLINE DIVIDER
FIG. 5(b)
PRIOR ART
FIG. 6
PRIOR ART
| FIG. 6(a) PRIOR ART | FIG. 6(b) PRIOR ART |
| --- | --- |

MICROWAVE/OPTICAL TRANSFORMATION METHOD

CROSS REFERENCE TO RELATED APPLICATION

This application is a continuation-in-part of application Ser. No. 07/911,633 filed on 10 Jul. 1992 abandoned Jul. 10, 1995, the disclosure of which is incorporated herein by reference.

STATEMENT OF GOVERNMENT INTEREST

The invention described herein may be manufactured and used by or for the Government for governmental purposes without the payment of any royalty thereon.

BACKGROUND OF THE INVENTION

This invention provides a novel design and analysis tool for use with microwave stripline circuits and circuit elements. Microstrip and stripline circuit design is unlike that used by most electrical engineers. This is due to the fact that elements at higher frequencies are often distributed rather than discreet. The operating parameter of a stripline circuit or circuit element are found by utilizing different modeling tools from those used for standard electronics. Prior to the use of digital computers, the Smith chart was one the main tool used for this purpose. The Smith chart is useful in determining microwave circuit behavior, but it is cumbersome to use and does not represent a very intuitive tool. The advent of digital computers and advanced software packages capable of performing analysis of microwave circuits has replaced the Smith chart as the main tool. Computer algorithms may provide specific outputs concerning the circuit behavior, but they may not provide an intuitive understanding of the circuit under perturbational excitation. This invention provides the use of a graphical tool developed for optically thin film analysis and design. This invention allows a designer to take a microwave circuit element and convert it to an optical equivalent. This is possible because both microwave stripline circuit elements and optically thin films are structures that are actually the size of quarter wavelengths of the excitation radiation. The designer may visualize the behavior of critical components as well as optimize the circuit performance prior to fabrication of the physical circuit. Since one can easily construct a model based on impedance, the model disclosed here uses the optical admittance diagram to perform analysis, design and observe perturbational characteristics of the microwave circuit while it has been converted to a comparable optically thin film circuit.

SUMMARY OF THE INVENTION

This invention provides a novel design and analysis tool for use with microwave stripline circuits and circuit elements. The invention utilizes techniques that had previously been used in the realm of optically thin films. It in its simplest form, the invention models quarter wave segment microwave stripline elements and reconfigures them as quarter wave optically thin films which are always sequential in their ordering. Also in its simplest form, the graphical interpretation provides for an intuitive graphical output that allows the designer to visualize performance and circuit perturbational characteristics in a manner that is vastly superior to previous techniques, such as the Smith chart, which gives little insight to the designer into the operational characteristics of the circuit or circuit elements performance prior to fabrication and testing. This invention is not limited to quarter wave segments, nor to strictly graphical interpretation. The circuit fabricated will perform as predicted. By using computational methods, specific amplitude and phase information can be obtained for generalized microwave stripline circuit elements. Circuits and circuit elements that span a vast wavelength range may be adaptable depending on their specific utilization.

The invention can be used to design and analyze distributed microwave circuit elements. For design work, the invention can be used to match impedance between microwave circuit elements, and in the design of filters can specifically be used for, but is not limited to the design of microwave stripline or microstrip equivalent elements such as: 1) Broadband filters; 2) Narrowband filters; 3) Edge filters; 4)Impedance matching; 5) Phase matching; 6) Power division; 7) Frequency based data separation; 8) Antennas; 9) Complex wave performance; 10) Etc. The invention is capable of providing design and analysis information for physical stripline circuits made of real materials with a variety of material properties such as permeability and permeativity which directly affect the performance of microwave stripline. By utilizing the admittance diagram for optical thin film filters on the modeled microwave stripline elements, elements of different material properties could be combined on a single stripline circuit board. For example, a design such as a copper stripline element and an aluminum stripline element could be built on a Kapton dielectric substrate. Proper matching could be performed by the invention outlined later.

A correlation between the optical thin film design and the microwave method of design is shown. The use of the Optical Admittance Diagram in the design of optically thin films involves a model consisting of stacks of single dielectric layers. The known use of the Quarter Wave rule as it pertains to thin films and the Optical Admittance Diagram, developed by Angus Macleod and presented in detail in his book, "Thin-Film Optical Filters." is discussed in a similar manner for the design of microwave stripline devices. This is a new use of the Optical Admittance Diagram. It is critical that the physical microwave stripline circuit elements which may exist as a combination of series and parallel elements be first converted to an equivalent electrical model. The stripline elements are normally quarter wave segments just as optically thin film. The techniques used in optical thin films and used for designing frequency (wavelength) broadened structures are applied to microwave components with comparable results. Microwave circuit components may thus be improved by using other techniques from optical thin film filter designs. For example, one may use the addition of a half wavelength long microwave stripline element to stabilize the frequency response of the circuit to slightly varying excitation. This result will be shown below and insight can be gained in not only the stability of the standing wave reflectance but also in the direction and magnitude of the resulting phase shift.

BRIEF DESCRIPTION OF THE DRAWINGS

For a better understanding of the nature and objects of this invention, references should be made to the following detailed specification and to the accompanying drawings, in which:

FIG. 1 illustrates a cross-section of stripline circuit. Shown is the copper stripline immersed in a dielectric sandwiched between two copper ground planes. The characteristic impedance of the stripline is a function of the strip width W, the strip thickness t, the relative dielectric constant, $\epsilon_r$ and the distance between the ground planes, b.

FIG. 1(*b*) illustrates a cross-section of a micro-stripline circuit. The copper strip lies on top of a dielectric material of thickness h. The characteristic impedance of the stripline is a function of the strip width W, the strip thickness t, the relative dielectric constant $\epsilon_r$, and h which is also the distance between the ground plane and the copper strip.

FIG. 2 illustrates air with an index of refraction of $n_0$, a single optically thin film layer with an index of refraction of $n_1$, on a substrate with an index of refraction of $n_{sub}$; and the reflection of light off of the surfaces of the optically thin film and the substrate, is shown as the combination of two beams. The corresponding optical admittances are $y_0$, $y_1$ and $y_{sub}$ respectively;

FIG. 4 illustrates an Optical Admittance Diagram for a thin film with admittance $y_L$ consisting of two quarter wave layers (one half wave layer) of the same material on a substrate with optical admittance $y_{sub}$. The half wave layer is represented by a circle centered on the real axis. The eighth wave points of the layer may be found at the intersections of the semi-circle centered on the imaginary axis at the origin (whose radius is the optical admittance of the thin film, $y_L$) and the circle representing the half-wave layer. Notice that the 2nd and 3rd quadrants lie outside of the contours which intersect at the eighth wave points and that the 1st and 4th quadrants lie inside the contour of the semi-circle centered at the origin, but are divided by the real axis. The 1st and 4th quadrants each make up one-half of the total semi-circle or one-fourth of a full circle.

FIG. 5(*a*) is the physical layout (top view) of an Uncompensated Wilkinson power divider made of a copper metal stripline which is normally sandwiched between two dielectric layers and copper ground planes, which are not shown;

FIG. 5(*b*) is the physical layout of (top view) of a compensated Wilkinson power divider made of a copper metal stripline which is normally sandwiched between two dielectric plates consisting of ground planes, which are not shown. The quarter wave segments have impedances of 70.7Ω and are thinner than the 50Ω segments as shown. The 100Ω difference resistor is also shown;

FIG. 9(*b*) illustrates the equivalent electrical circuit for the stripline power divider known as the Wilkinson Power with characteristic input and output impedances, $Z_0$=50Ω, difference resistance, $R_x$=100Ω and two quarter wave segments.

(a) The wavelength $\lambda_e$=36 cm shown in (a) is the wavelength that the microwave circuit/component is used at (See FIG. 16) instead of the design wavelength of $\lambda_d$=40 cm.

(b) The wavelength $\lambda_d$=40 cm shown in (b) is the center for the design wavelength. For FIGS. 14,16, and 17 the the microwave circuit/component is fabricated based on this being the wavelength (frequency) for which the circuit is to be used. Thus, the quarter wave length of the the microwave circuit/component segment is 10 cm.

(c) The wavelength $\lambda_e$=44 cm shown is the wavelength that the the microwave circuit/component is used at (See FIG. 17) instead of the design wavelength of $\lambda_d$=40 cm.

Figure 16:
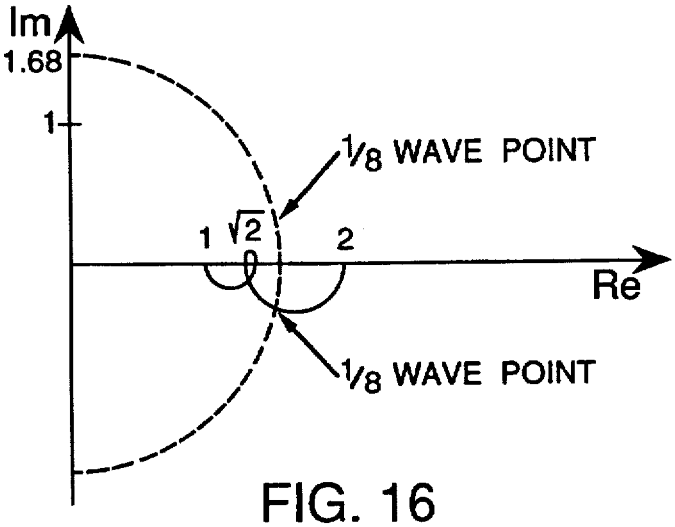

FIG. 16 is the Optical Admittance Diagram representing the Compensated Wilkinson Ppower Divider with a design wavelength $\lambda_d$=40 cm and a shorter excitation wavelength $\lambda_e$=36 cm, (a quarter wave of 9 cm). The first semicircle is too long, due to the additional 1 cm segment. While there is not a good match to the center of the horizontal axis, the next semicircle which begins at the end of the first and is also longer still ends up at the same end point. Hence, compensation is shown to take place. A slight phase shift will take place in the end point because of the shift along and above the horizontal axis. The match is not perfect but quite close. The λ/8 is also shown as discussed in FIG. 4.

Figure 17:
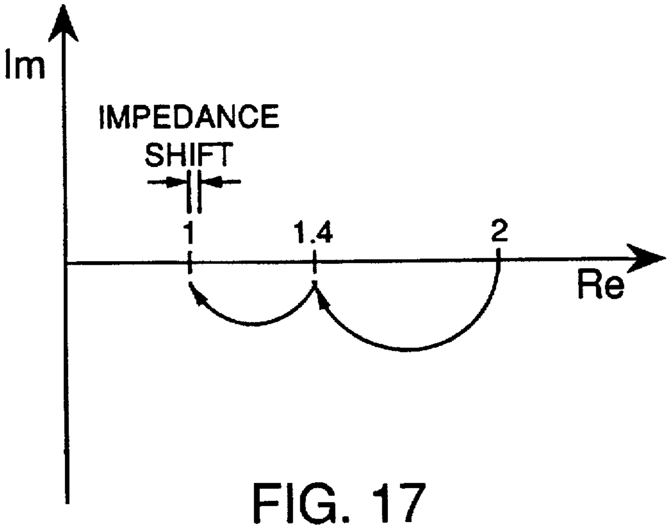

FIG. 17 is the Optical Admittance Diagram representing a Compensated Wilkinson power divider with design wavelength $\lambda_d$=40 cm and a longer excitation wavelength of $\lambda_e$=44 cm, (a quarter wave of 11 cm). The first semicircle representing the quarter wave segment falls short of reaching the horizontal axis due to the 1 cm difference between the design quarter wave segment and the signal quarter wave. The second semicircle is also short, but since it begins below the horizontal axis it will intersect very close to the design impedance end point on the horizontal axis showing compensation for longer wavelengths. A slight phase shift will take place in the end point because of the shift along and below the horizontal axis. The match is again not perfect but quite close.

Figure 18:
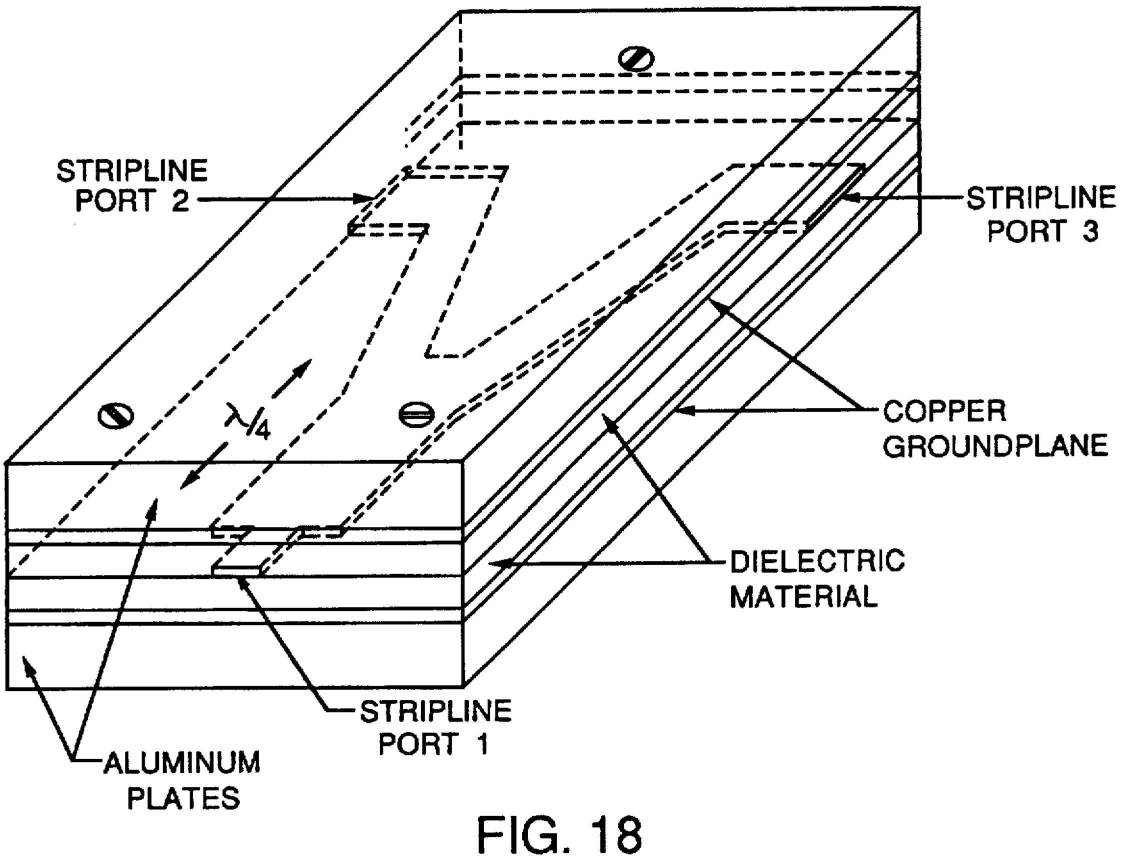

FIG. 18 illustrates the physical construction of a Compensated Wilkinson power divider. The power divider circuit is produced from a plate that is dielectric material on one side and copper on the other. A film of the power divider which looks very much like a photograph negative is laid over the copper side of the plate which has had a photo emulsion type material deposited on it. The combination is exposed to light in the same manner as a photo graph would be for development. The exposed plate is developed the same way with the addition of having the copper etched away using automatic equipment, leaving only the copper of the power divider on the dielectric material, which is the Wilkinson power divider circuit. The power divider circuit is then sandwiched between two plates consisting of a dielectric material $\epsilon_r$ on one side and a copper ground plane on the other (also called b'-boards), as shown. The power divider circuit and b'-boards combination is then placed between two aluminum plates and secured by appropriate screw placement. The power divider stripline ends of ports 1, 2, and 3 are shown without connectors for clarity. Notice the quarter wave segment that was added for compensation and frequency broadening.

Figure 19:
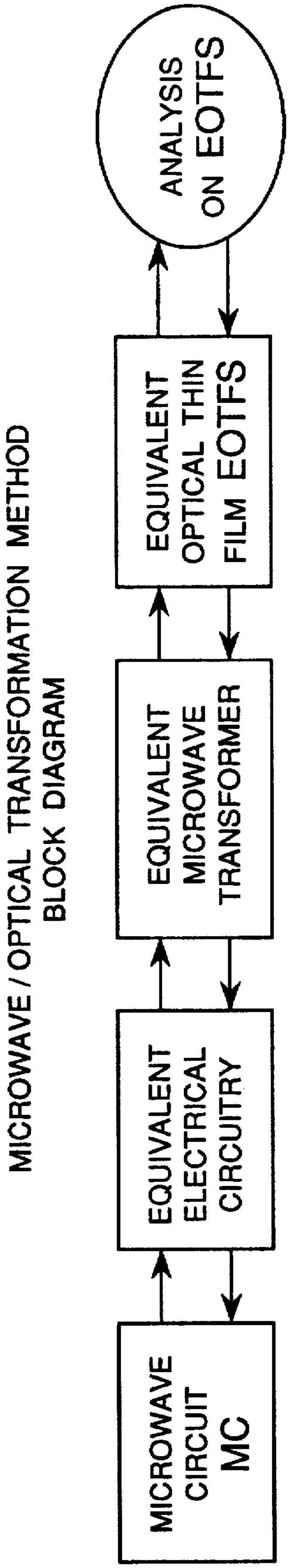

FIG. 19 shows a simplified block diagram of the MOT Method procedure. The arrows indicate the transformation from one state (box) to the next. Notice that the analysis on the EOTFS is not shown as a state (box) but as an ellipse indicating an evaluation arena, where MC is the Microwave circuit/Components.

DESCRIPTION OF A PREFERRED EMBODIMENT

The basic principal involves a microwave circuit and/or component (MC) that is modeled as an equivalent optical thin film stack (EOTFS) which is then analyzed and/or designed using the Optical Admittance Diagram (OAD), which was developed by Angus Macleod. This analysis and/or design relate directly to the real physical MC which may be in the form of several types of transmission lines such as microwave microstripline or stripline construction as shown in FIG. 1. These microwave circuits and/or components can be fabricated automatically and provide the required uniform signal paths required for microwave transmission. FIG. 1(*a*) shows a microwave stripline circuit construction which consists of a conducting metal strip, usually copper, that lies parallel to and between two wide conducting planes also made of copper. A uniform dielectric fills the region between the strip and the planes. FIG. 1(*b*) shows the construction of a microwave microstrip circuit which consists of a uniform dielectric which lies parallel to and between the conducting metal strip and the parallel ground plane, both usually made of copper. The characteristic impedance of a microstrip line is a function of the strip-line width, w, the strip-line thickness, t, the distance, d, between the line and the ground plane, and the relative dielectric constant, $\epsilon_r$ of the board material. Utilizing a method, which will be called the Microwave/Optical Transformation Method or MOT Method, one can transform a microwave circuit to an equivalent optical thin film stack (EOTFS), perform analysis and design for the required MC specifications; build the MC from the reverse transformation, reverse MOT method on the EOTFS design and expect the MC to perform accordingly. The MOT Method provides a unique tool as compared to the existing microwave design techniques use today. In the realm of OTFS, the optical thin film design tools that will be presented are simple to use yet provide powerful results and insights into the performance of the OTFS. They therefore provide corresponding capabilities when the EOTFS is transformed back into the MC. There is a one to one correspondence between the performance of EOFTS and the MC. However, to understand why the transformation of the MC to an OTFS produces a faithful representation of that original MC we shall look at optical thin film (OTF) theory and how it relates to MCs. We shall assume that both are comprised of elements that are made up of quarter wave segments. However, it must be remembered that the correspondence between MC and OTFS remains for generalized systems and is not limited to quarter wave analysis. In fact, the OAD easily predicts the behavior of non-quarter wave elements for OTFS and hence MC.

A brief discussion of basic concepts, and an explanation of thin film filters (used at normal angle of incidence), the Smith chart and the OAD follow. The analysis assumes that the OTFs are used at a normal angle of incidence only, to model the behavior of microwave elements. The term "thin" refers to thickness of the film with respect to the wavelength of interest and implies that the structure supports interference effects. While only a graphical form of the OAD will be discussed, exact values can be calculated utilizing the analysis discussed by Macleod in *Thin Film Optical Filters, Macmillian Publishing Co., New York, N.Y., Adam Hilger Ltd. Bristol,* 1986. The utility of the MOT Method provides a graphical technique to promote visualization of microwave circuit performance.

In general, when reflectance takes place in a medium of lower refractive index to a medium of higher refractive index there is a 180° phase shift. A 0° phase shift takes place in the opposite case, from higher to lower refractive indices. Reflectance can be represented as;

$$R = r^2 \tag{1a}$$

$$r = \frac{1 - Y}{1 + Y} \tag{1b}$$

where, r is the amplitude reflectance, R is the intensity reflectance and for a quarter wavelength thick thin film.

$$Y = \frac{y_1^2}{y_{sub}} \tag{2}$$

here $y_0$, $y_1$, and $y_{sub}$ are optical admittances of three different medias of OTF layers in contact as shown in FIG. 2 where a single OTF layer with index of refraction $n_1$ is on a substrate with an index of refraction $n_{sub}$. The incident light media of air has an index of refraction $n_0$. Light is incident on the thin film at zero degrees, but is shown with a finite angle for clarity. The two reflected beams from the top and bottom surfaces of the thin film recombine coherently. Here, Y may be thought of as an equivalent optical admittance. We may interpret the action of the film as transforming the admittance $y_{sub}$ into an equivalent optical admittance $y_1^2/y_{sub}$ and this expression is known as the Quarter Wave Rule (QWR) for optical thin films. This then gives us the refractive index relationship which should remain unchanged. The index of refraction "n" of a thin film layer is related to the optical admittance y of that layer by the following equation, $$y = Y_f n \quad (3)$$

where, $Y_f$ is the admittance of free space. This applies strictly to mediums where the relative permeability, $\mu_r=1$ and represents homogeneous, isotropic, linear, and time-invariant materials. Thus, in the optical region where this is satisfied, equation (2) from above can be re-written for the refractive index N and takes the form as shown in the following equation, $$N = \frac{n_1^2}{n_{sub}} \quad (4)$$

Because of this simplification, optical admittances are usually quoted in units of the admittance of free space so that they have the same numerical value as the refractive index. Equation (2) represents an example of a single layer of optical admittance $y_1$ on a substrate with optical admittance $y_{sub}$ with incident media $y_0$.

In FIG. 2, the indices of refraction may be replaced by their respective optical admittances. Y represents the equivalent optical admittance of the overall assembly. A single anti-reflecting optical thin film coating on a lens made of glass would have the same form with $y_0$, the optical admittance of air being equal to one, $$y_0 = 1 \quad (5)$$

Figure 3A:
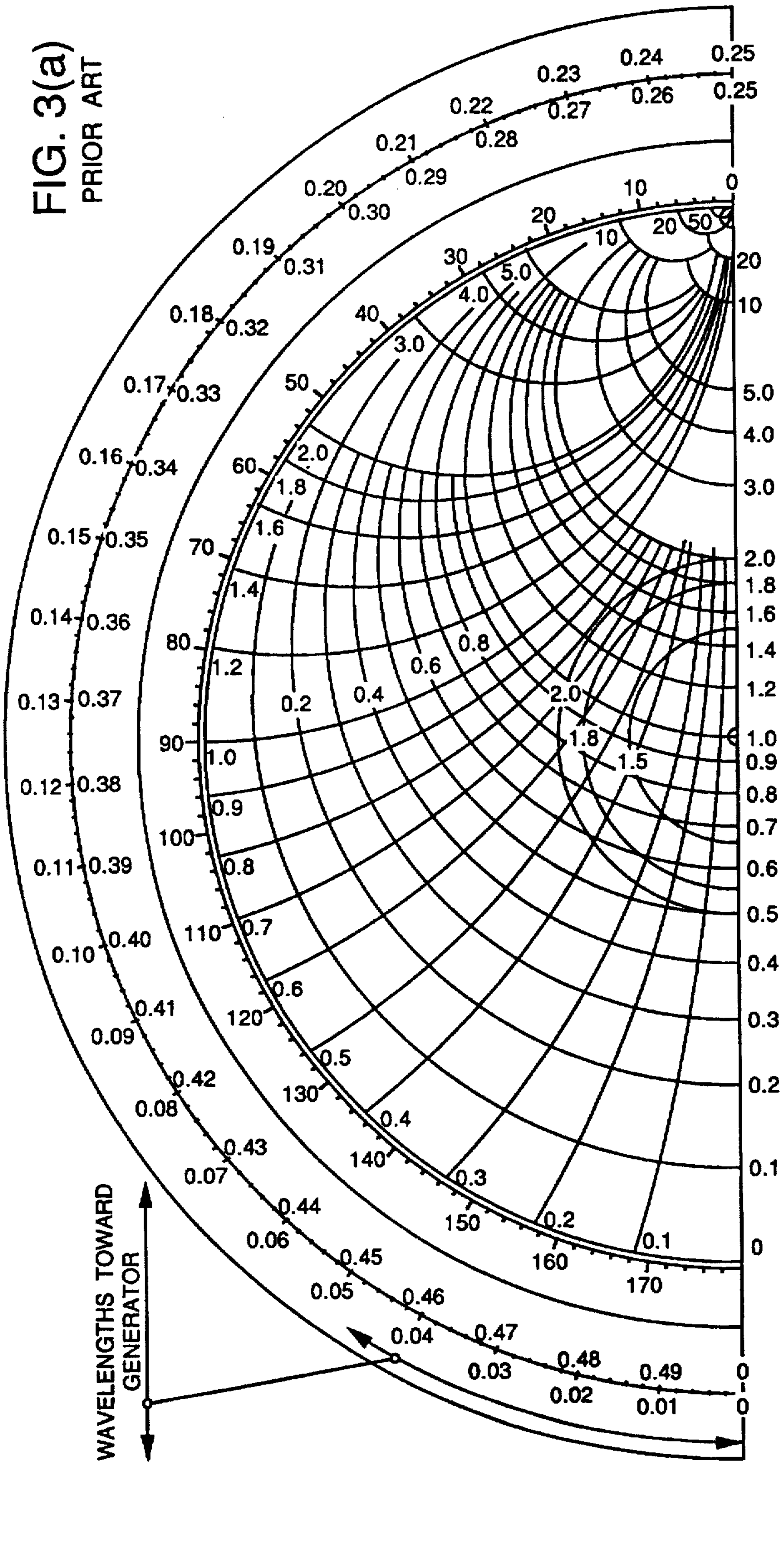
FIG. 3(a) PRIOR ART
FIGS. 3, 3(*a*) and 3(*b*) illustrate a standard Smith chart consisting of loci of constant resistance and reactance plotted in the complex plane where w=u+iv on a polar diagram. The corresponding real and imaginary parts are read from sets of orthogonal circles. Phase, VSWR, reflection coefficient and impedance along a transmission line may be obtained.
Figure 3B:
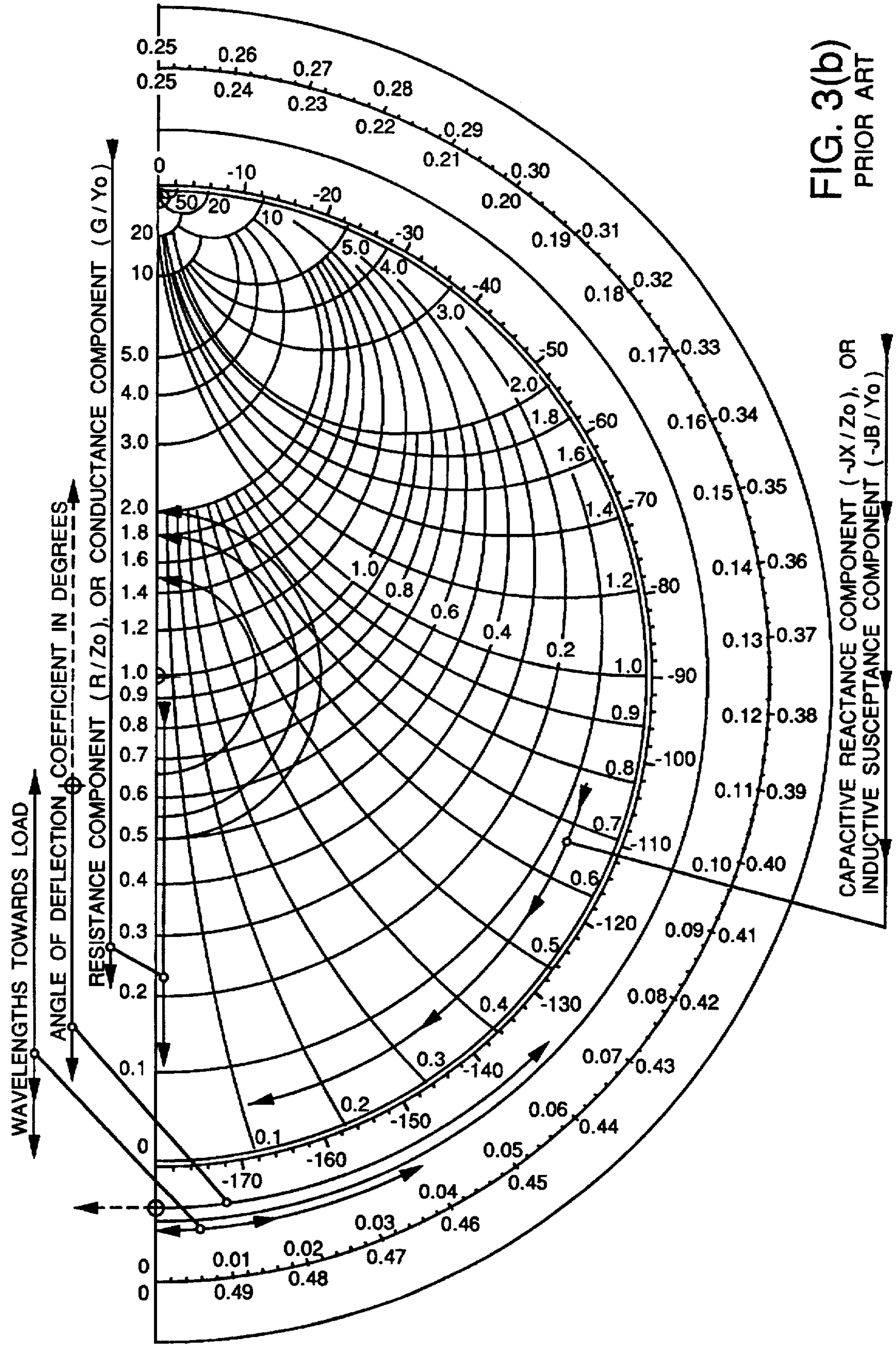
FIG. 3(b) PRIOR ART

The Smith chart shown in FIGS. 3(*a*) and 3(*b*) is used to calculate various properties of transmission lines and consists of constant resistance and reactance plotted in the complex plane where w=u+iv on a polar diagram. One can find the impedance transformed along a transmission line or relate the standing wave ratio or the reflection coefficient to the impedance. It allows one to understand the behavior of complex impedance matching techniques. The impedance relations that the Smith chart gives for a lossless line of different loads is important for this invention and is represented by the following equation as, $$X = \frac{1-Z}{1+Z} \quad (6)$$

where, Z is the impedance and is plotted in polar coordinates. The corresponding real and imaginary parts of X are read from the sets of orthogonal circles on the Smith chart and will be discussed in more detail later. Notice the similarity between Equations (1b) and (6).

The OAD also uses a graphical approach of the Smith chart to relate the various properties of optical thin film layers. The OAD, shown in FIG. 4 for a single, thin film layer deposited on a substrate of index of refraction $n_{sub}$ and hence optical admittance $y_{sub}$. The deposition of the layer begins at the substrate $y_{sub}$ on the real axis with a phase shift of $\phi=\pi$ for the design wavelength $\lambda_d$. As deposition proceeds, the circle continues clockwise intersecting the other semicircle that is centered at the origin with a radius $y_L$. At the point of intersection the optical path is $\lambda/8$ wave thick and light would have a phase shift of $\phi=\pi/2$. As deposition continues, the circle intersects the real axis at $y_L^2/y_{sub}$. The optical thickness is one quarter wave and the phase shift for the light is $\phi=0$. As more material is deposited on the substrate the thickness of the layer increases passing the ⅜λ wave thickness point with a phase shift of $\phi=3\pi/2$, and finally intersects the real axis at the starting point, but with one half wave layer thickness and a phase shift again of $\phi=\pi$ for the design wavelength $\lambda_d$. The first, second, third and fourth quadrants are also shown in FIG. 4. Thus, the OAD is made up of half the complex plane which can be further divided into four regions that correspond to the quadrants of phase shift upon optical reflection. Shown in FIG. 4 are the four quadrants separated by the real axis and the semi-circle centered at the origin with radius $y_L$. The arc or circular locus represents a single thin film half wave layer. The complete circle or half wave layer is made up of the two semicircles (each representing a quarter wave thin film) layer deposited on a substrate. Notice that when one deposits a half wave on a substrate, the ending point and the starting point coincide. The optical admittance is mapped back into the original value as if the layer were absent, or not there. That is why a half wave layer is called an "absentee layer", because at the design wavelength it appears to be absent. However, when the design wavelength is perturbed the action of the half wave layer can have profound effects on the circuit performance depending on its position in the OTFS. Procedures for calculating the equations for these contours are outlined in Macleod's text. The points connecting the arcs of circles correspond to the interface between the OTF layers.

What is important for this invention is to remember that the OTFS represents the original MC. The result of analyzing the OTFS is to analyze the MC. There is a one to one correspondence between the OTFS performance under a variety of conditions and the real physical MC under the same conditions. This should be kept in mind throughout this discussion. The OTFS is an idealized concept that allows one to evaluate the physical MC prior to and/or after fabrication.

In the example of the Wilkinson power divider, we will use the MOT Method to first show how to produce the OTFS model from the actual microwave circuit. We will show how to perform simple analysis of the MC, by performing analysis on the OTFS. We will then show how to design compensation for the Wilkinson using the OAD and the QWR.

In the case of the Wilkinson power divider shown in FIGS. 5(*a*) and 5(*b*) these points would represent the interface between segments of transmission lines physically fabricated as microwave stripline construction as shown in FIG. 1. The Wilkinson power divider which is a microwave stripline component will be discussed later.

Figure 6A:
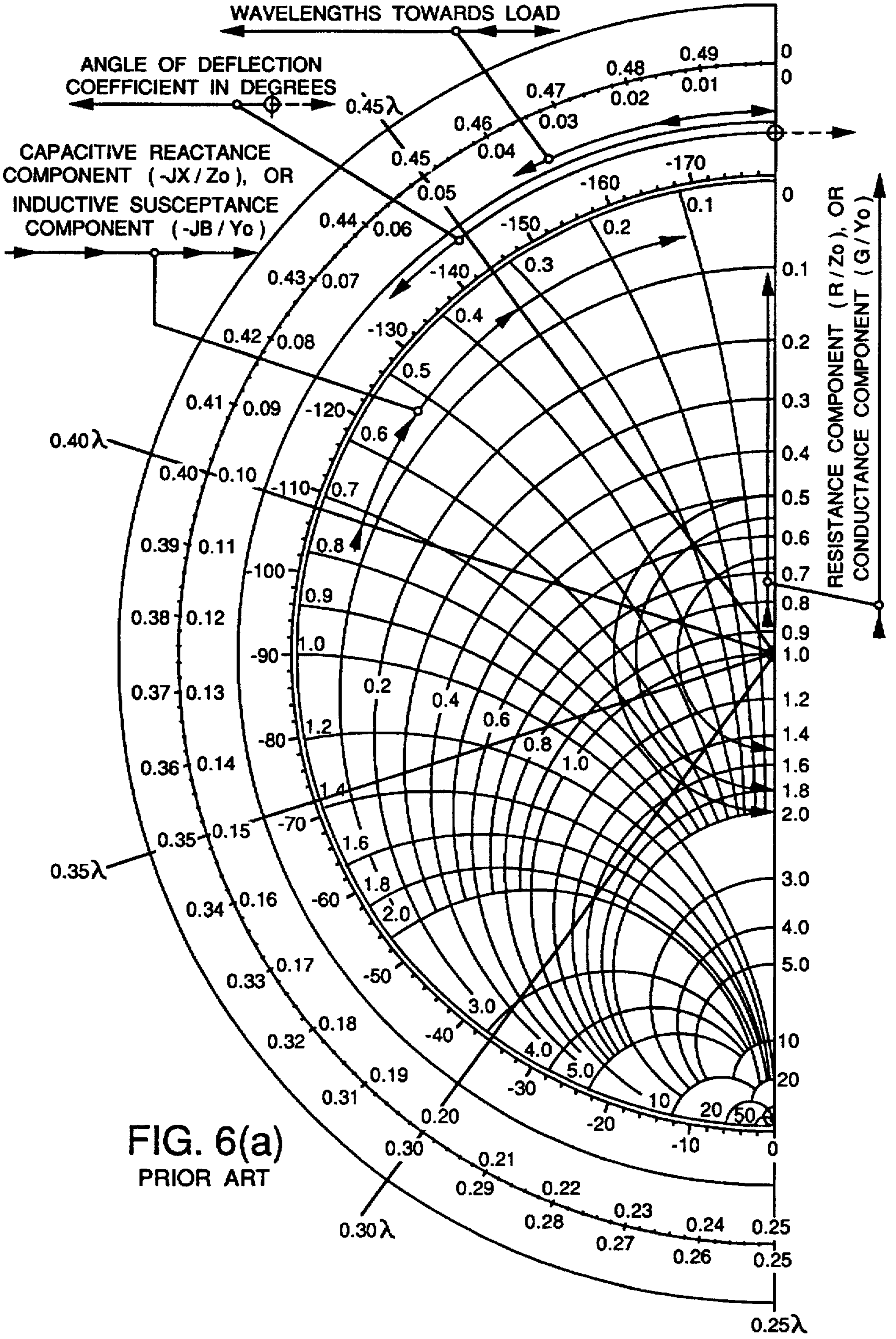
FIG. 6(a) PRIOR ART
FIG. 6 shows, (Macleod, pg 57) how optical admittance may be displayed on the Smith chart of FIGS. 3(*a*) and 3(*b*) by defining the optical thickness in fractions of a wavelength measured towards the medium of incidence, in this case an optically thin film layer on a substrate.
Figure 6B:
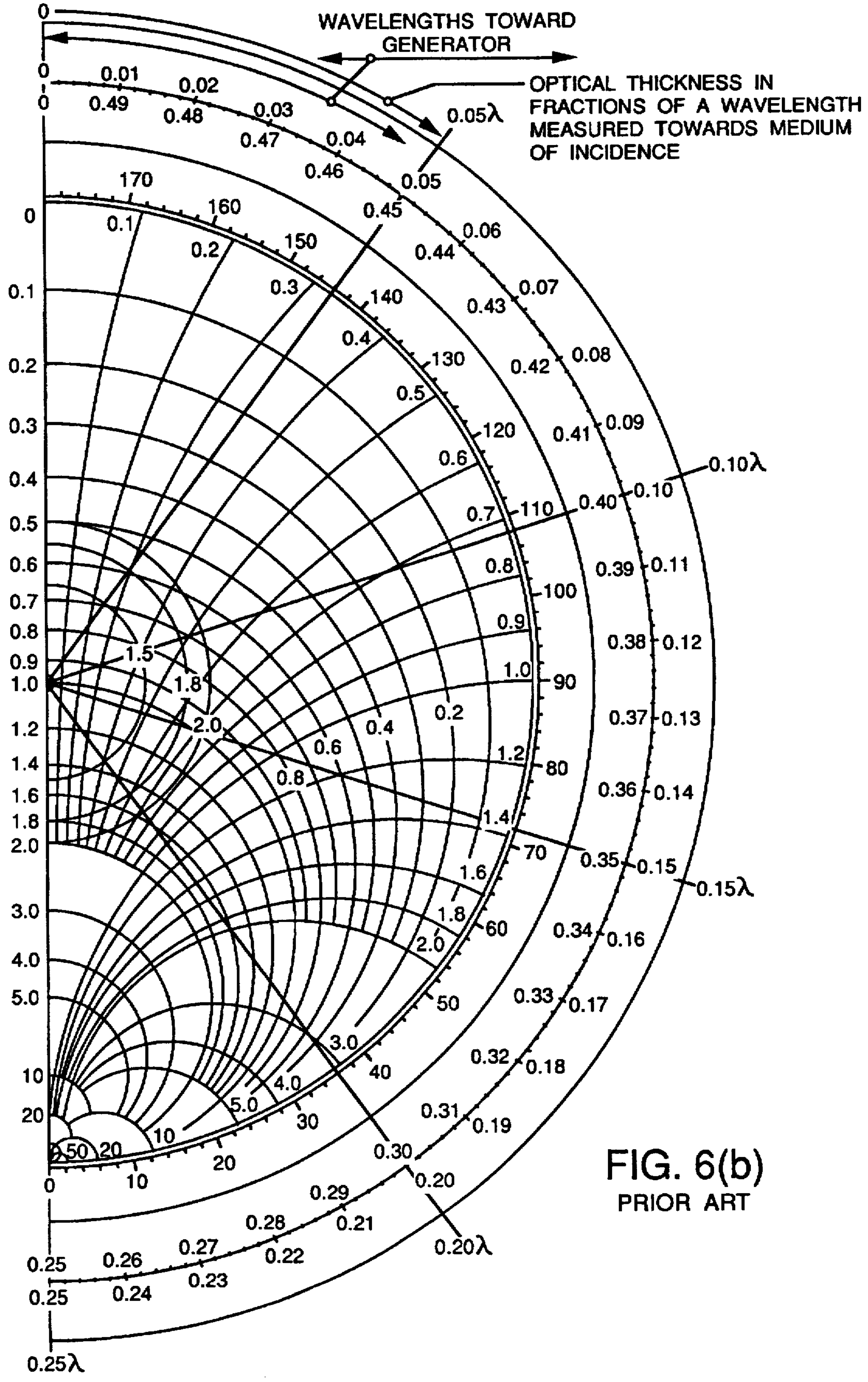
FIG. 6(b) PRIOR ART

The Smith chart can be used to determine impedance and admittance with any load, standing wave ratio (SWR); and capacitive or inductive reactances of short circuited transmission lines or small sections of transmission lines called stubs. For ease of calculation these parameters are normally determined for lossless lines. A similar situation exists for dielectric films where one assumes no absorption. However, it is also possible to calculate for lines with loss and optical thin films with absorption as well. The most important application of the Smith chart is the utilization of quarter wave stubs to match a load to a line. For this invention, the OAD is utilized in a similar manner because it too uses a quarter wave matching technique. Therefore, the OAD may be applied to MC design in a manner similar to the Smith chart shown in FIGS. 6(*a*) and 6(*b*). The OAD can be hand-drawn immediately which allows one to observe the behavior of the circuit design in a faster more simple means prior to fabrication of the physical circuit. The Smith chart offers some of the same insight prior to fabrication. However, microwave design engineers will agree that the Smith chart is more complicated and cumbersome to hand-draw and would require computer assistance for analysis. The following sections will explain some of the reasoning behind this concept.

Microwave Stripline elements may be constructed of quarter wave length segments or sections of copper strips on a dielectric surface. This quarter wavelength feature is also common in optical thin film design. It follows then, that certain performance characteristics are also common. A designer for both microwave stripline elements and OTF elements may wish to reduce or enhance reflected components; or phase match between elements; or produce an element that has broadband characteristics; or even sharpen the band characteristics with a spike filter. The use of the OAD and the QWR for OTFs can be seen as an extension from quarter wave elements at optical frequencies to quarter wave elements at microwave frequencies and will involve a method referred to as the Microwave/Optical Transformation Method, or MOT Method.

We will begin by looking at one of the simplest optical thin film elements, a single optical thin film layer used to match the optical admittance of an optical substrate to the optical admittance of the incident media taken to be air, as shown in FIG. 2. This is analogous to impedance matching in microwave circuit design techniques. Here, light is incident on a planar optic made of glass coated with an optical thin film. The light reflected at the top and bottom layer(s) of an OTF layer assembly must cancel to behave as an anti - reflective coating or filter. From Equations (1a) and (1b) this means that 1−Y=0 or, $$y_1^2=y_0y_2 \tag{7}$$

where the value of the optical admittances are, for example $y_0=1$ for air and $y_2=1.52$ for glass. Therefore, the OTF admittance should be between the optical admittance of air and the substrate to accomplish complete cancellation, for this example $y_1=1.23$. The optical thickness of the film should be one quarter wavelength to insure 180° phase shift. In other words, the total difference in the phase shift between the two beams should be equal to one half wavelength.

An optical thin film multilayer or OTFS, also known as a quarter wave stack, is an optical thin film filter. It consists of quarter wave thin film layers whose indices are stacked alternately high and low in the assembly. Upon reflection, the high index layer will not experience a phase shift, while light in the lower index layers will have a 180° phase shift. For enhanced reflectors this results in a constructive recombination at the front surface. The reflectance of the optical thin film multilayer depends on the wavelength and the number of high and low index layers. The quarter wave OTFS technique is commonly used in the design of OTF filters. Similarly, a series or stack of quarter wave length stripline segments may be utilized with this technique to develop a method for the design of MC.

A brief discussion on how quarter wave optical thin film layer elements or the combination of quarter wave optical thin film layers forming half waves elements (sometimes called absentee layers) are used to produce optical thin film multilayer assemblies, will now be discussed. As discussed previously, half-wave optical thin film layers are called "absentee layers" because at the design wavelength, the light reflected from the bottom surface of the optical thin film layer has undergone a 360° phase shift with respect to the incident light reflected from the top surface, that is apart from any phase shift from the reflection at the boundaries themselves. This results in the suppression of any interference effects and the effective elimination or cancellation of the half wave optical thin film layer. It is therefore correct and convenient to omit half wave layers for ease of designing the assembly properties. But, it must be remembered that they are absentee layers only at the design wavelength. However, for slight wavelength (frequency) shift, the effects of these layers can be quite pronounced. They can be used to "flatten" or "sharpen" the performance of a circuit depending on their placement in the MC and/or OTFS. The MOT Method uses the OAD to analyze and design MC and OTFS with half wave layers in a very easy to use manner that is visual in nature and hence very intuitive.

Figure 7:
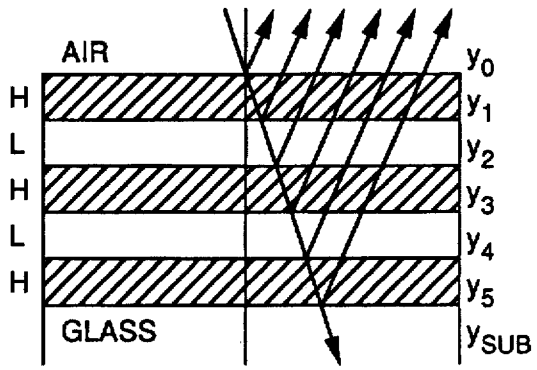
FIG. 7 PRIOR ART
FIG. 7 shows a stack of five quarter wave optical layers with an alternating High and Low indexes of refraction on a glass substrate. This is written air |HLHLH| sub. Also shown are the reflected beams of light off of each surface.

The addition of an odd number of optical thin film quarter wave layers with optical admittance y alters the equivalent optical admittance from Y of the assembly to $y^2/y$. By extension, a stack of five quarter wave layers of different materials (as shown in FIG. 7) can easily be represented as, $$Y=\frac{y_1^2y_3^2y_5^2}{y_2^2y_4^2y_{sub}} \tag{8}$$

or $y_i$ for the optical admittance of each $i^{th}$ layer, where i represents layers 1 through 5, and $y_{sub}$ is the optical admittance of the substrate.

Figure 8:
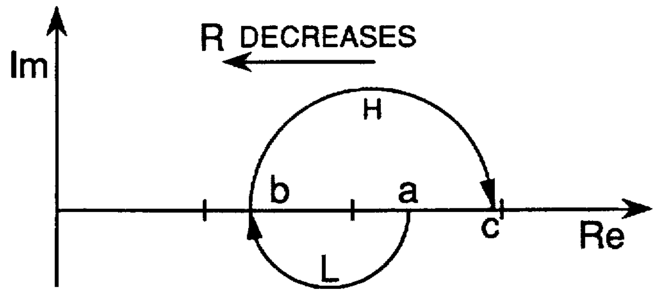
FIG. 8 illustrates an Optical Admittance Diagram for a Low-High stack on a glass substrate. This may be written air |LH| sub. Note that reflection decreases as one moves toward the admittance value of air which is one.

Assemblies of quarter and half wave layers are often used in the design of optical thin films because of the simplicity of the calculations involved. It is only necessary to specify the number of quarter or half waves OTF layers and the wavelength. Usually, the materials for quarter wave optical thicknesses are specified as H for a High index of refraction, M for an intermediate index and L for a Low index. Half waves are represented by HH, MM, or LL. For example, an OTFS assembly of high and low indices consisting of quarter wave OTF layers on a glass substrate would be represented by, Air|HLHLH|Glass and is shown in FIG. 7. An optical thin film multilayer containing some quarter wave and half wave layers (absentee layers) may be represented with the ends of the semicircle lines indicating the layers which can be illuminated at the design wavelength is shown below, Air|HLHHLHLH|Glass, At the wavelength for which all H, L are quarter waves, this reduces to just, Air|LH|Glass, since the absentee layers can be neglected. FIG. 8 shows the OAD for the Low-High index layers configuration without the absentee layers. The closer the effective optical admittance comes to the input optical admittance, which for air is 1, the lower the reflectance R. The addition of the two layer stack is seen to increase the reflectance because the effective optical admittance is now greater than the substrate optical admittance. In optical systems one might use this design to increase the reflectance of a mirror. The value of the optical admittance at the starting point a, is just $y_{sub}$ and proceeds clockwise for the low optical admittance layer L to point b, by giving $y_1^2/y_{sub}$. The optical admittance then continues in a clockwise direction for the high index layer H ending at point c. The result is the effective optical admittance, $$Y=\frac{y_H^2y_{sub}}{y_1^2}. \tag{9}$$

The OAD, developed by Macleod uses a graphical approach like the Smith chart to relate the various properties of OTF layers although the emphasis is on optical admittance rather than amplitude reflection coefficient. The quarter wave matching technique utilized by the Smith chart to design transmission lines such as stripline circuits is similar to that of the OAD for the design of quarter wave optically thin film layers or coatings. This technique will be illustrated by designing a typical microwave circuit known as the Wilkinson power divider. A stripline model using quarter wave segments will be developed for the power divider. The behavior of the microwave circuit will be analyzed using the MOT Method. The advantage for this invention is that the OAD representation of the MC allows a quick visual method of analyzing its performance prior to fabrication.

Figure 9A:
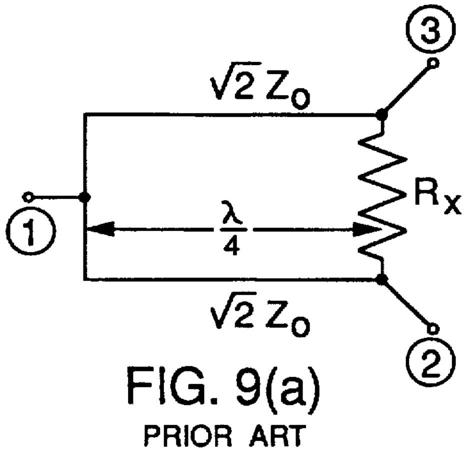
FIG. 9(a) PRIOR ART
FIG. 9(*a*) illustrates a three port stripline binary power divider with characteristic impedance of $Z_0$,difference resistance of $R_x$ and two quarter segments. Port 1 is the input port.
Figure 9B:
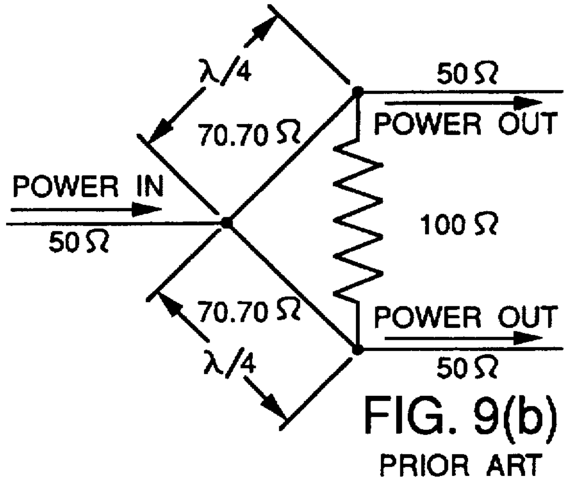
FIG. 9(b) PRIOR ART

The electrical equivalent circuits for uncompensated and compensated Wilkinson power divider, shown previously in FIGS. 5(*a*) and 5(*b*), are now shown in FIGS. 9(*a*) and 9(*b*) respectively. The Wilkinson power divider is used as a broadband stripline circuit for power division which provides equal phase characteristics and isolation between the output ports. In FIG. 9(*a*), the binary power divider is shown with port 1 as the input, ports 2 and 3 the output ports and $R_x$ as the difference resistor. FIG. 9(*b*) shows the schematic of FIG. 9(*a*) with the characteristic impedance of the line equal to 50Ω on the input and output lines, and 100Ω for the difference resistor. Both dividers consist of quarter wave (λ/4) segments. This three port device presents a matched termination at the input (sum) port 1, when the other ports are match terminated. The power at the input port 1 of this binary power divider splits equally among the two other ports 2 and 3 as shown in FIGS. 9(*a*) and 9(*b*).

Either of the output ports 2 or 3 may be isolated when power is delivered to one of them, while port 1 and the other remaining port are match terminated. The sum port will then receive power with some loss. The power divider used in this example consists of quarter wave stripline segments with characteristic impedances of 70.7Ω as shown in FIG. 9(*b*). The Quarter Wave Rule for Thin Films was applied to verify the impedance values of the uncompensated and compensated dividers shown in FIGS. 5(*a*) and 5(*b*). The quarter wave rule for thin films comes from the reflectance Equations. (1a), (1b) and (2). Letting R=0 for zero reflectance gives, $$y_1=(y_0 \times y_2)^{1/2} \tag{10}$$

Figure 10:
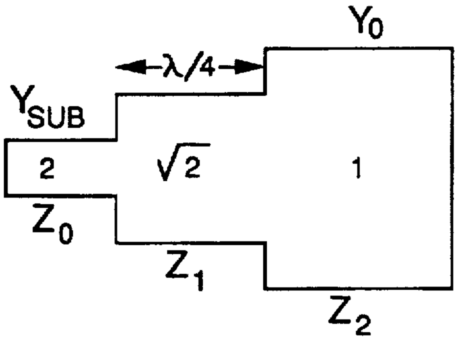
FIG. 10 illustrates the Transformer Model of the Wilkinson power divider (Top View) which uses a quarter wave matching segment, where the segments are a continuous strip made of copper (not drawn to scale) on a dielectric plate containing a copper ground plane on the other side (not shown). (The top dielectric plate with ground plane is also not shown)

The QWR for OTFs can also be represented in terms of transmission line impedances for the power divider as, $$Z_1=(Z_0 \times Z_2)^{1/2} \tag{11}$$

where, $Z_1$ is used to impedance match $Z_0$ to $Z_2$ and is the parallel combination of the two 70.7Ω quarter wave impedances at the junction; $Z_0$ is the characteristic impedance of the power divider transmission line of 50Ω and $Z_2$ is the parallel combination of the two output pod impedances which results in an impedance of 25Ω as shown in FIG. 10.

Figure 11:
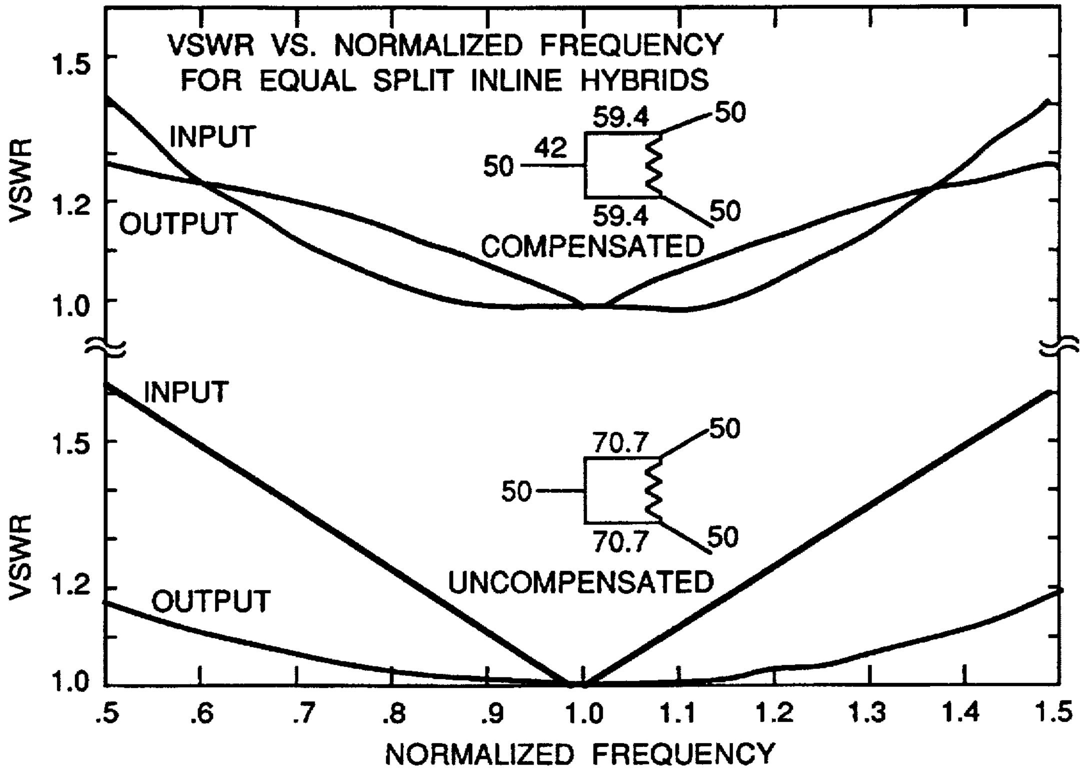
FIG. 11 PRIOR ART
FIG. 11 illustrates the voltage standing wave ratio (VSWR) versus normalized frequency for the Uncompensated and Compensated Wilkinson dividers and shows the broadening of the frequency band with the addition of a quarter wave segment.

The compensated power divider improves the performance by the addition of a quarter wave length stripline segment commonly known as a transformer, in front of the power division junction as seen in FIG. 5(*b*). In microwave circuit design, a transformer is generally used to simply transform the impedance of a line from its fundamental impedance to either a higher or lower impedance level using a single quarter wave segment, for narrow band operation or multiple quarter wave segments for broader band operation which will be discussed later in detail, including figures for clarity. In this case, the result is a shift in the impedance levels and a broader frequency band as shown in FIG. 11.

It can be seen that no power is dissipated in $R_x$ shown in FIGS. 9(*a*) and 9(*b*), when $Z_0$ terminates pods 2 and 3. Also the energy is at the same potential and Port 1 has an input impedance of $Z_0$. If the source is then placed on port 2 for example with matched loads ($Z_0$) on ports 1 and 3, even and odd mode analysis is needed to give the characteristic ABCD matrix involving the voltages and currents for each of the modified even and odd mode circuit models to be analyzed. Using this analysis the value of the difference resistor $R_x$ was found to be equal to 2 $Z_0$ or 100Ω.

The impedances for the uncompensated power divider design was verified using the quarter wave rule for electrical impedances as shown in the following equation, $$Z_1=(50\Omega \times 25\Omega)^{1/2}=35.35\Omega \tag{12}$$

The objective is to match a 50Ω line to a 25Ω line. A quarter wave length stripline transmission line segment with an impedance of 35.35Ω placed between the 50Ω and 25Ω segments will correctly match the two lines together.

It is desirable to have a visual method of representation to analyze these results. The Optical Admittance Diagram accomplishes this. Using Equation (2) for plotting equivalent optically thin film layers on the OAD and representing the terms as impedances of the microwave stripline elements for this uncompensated power divider gives, $$Z_2=\frac{Z_1^2}{Z_0}. \tag{13}$$

For this example, $$Z_2=\frac{(35.35\Omega)^2}{50\Omega}=25\Omega. \tag{14}$$

In order to represent these results in terms of optical admittance it is convenient to use the 25Ω impedance to normalize $y_0$ to one. In other words, use Equation (13), but let $y_0=Z_2/Z_2$, $y_1=Z_1/Z_2$ and $y_{sub}=Z_0/Z_2$, which gives, $$y_0=\frac{y_1^2}{y_{sub}}=1. \tag{15}$$

For zero reflectance R=0 and with $y_0$=1, we have the following equation, $$y_1=(y_{sub} \times y_0)^{1/2}=(2)^{1/2} \tag{16}$$

where, as stated above, $y_{sub}$=50Ω/25Ω.

Figure 12:
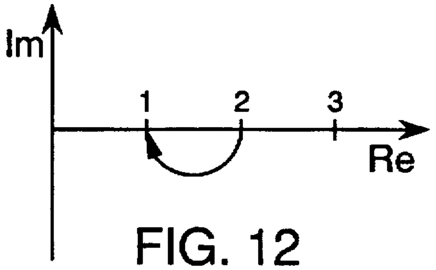
FIG. 12 illustrates the representation of the Uncompensated Wilkinson power divider as plotted on the normalized Optical Admittance Diagram.

For a low index optically thin film layer on a glass substrate this would be represented as, air|L|glass Therefore, on the OAD shown in FIG. 12, the transition layer is represented beginning at the substrate with optical admittance, $y_{sub}$ of 2 and continuing clockwise through the quarter wave layer to optical admittance, $y_0$ of 1, as shown in FIG. 12. In terms of impedance, the transformer matching transition begins at the 50Ω segment, normalized to 2, and continues through the 35.35Ω segment, normalized to $(2)^{1/2}$ and continuing to the 25S segment of transmission line which is normalized to 1 as shown in FIG. 10.

Figure 13:
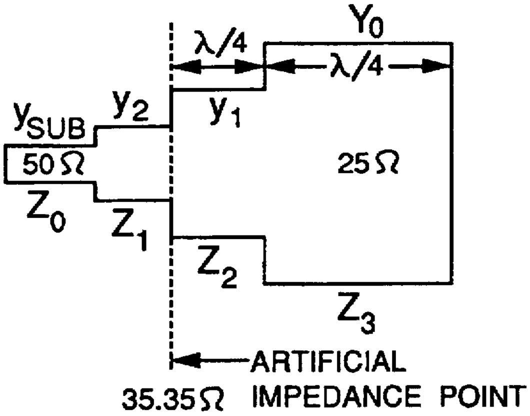
FIG. 13 illustrates the transformer model for the Compensated Wilkinson power divider; (Top View) which uses two quarter wave matching segments between 25Ω, and 50Ω segments, where the segments are a continuous strip (not drawn to scale) made of copper on a dielectric plate containing a copper ground plane on the other side (not shown). (The top dielectric plate with ground plane is also not shown). Also shown by the dotted line is the artificial impedance point used to match between the two quarter wave segments. Representations, $Y_{sub}$ and $Y_0$ of the optical thin film layers are included to show their relationship to the equivalent impedance of the stripline segments.

For the compensated power divider shown in FIG. 5(*b*), a quarter wavelength segment with an impedance of 42Ω was added between the junction and the input port. The addition of this segment requires a change in the impedance values of the quarter wavelength branches from 70.7Ω to 59.4Ω. In order to verify these values, the parallel combination of the 59.4Ω and 50Ω branches were considered. A quarter wave transformer model was then designed using the technique described above and is shown in FIG. 13. In the previous example, it was shown that the center of the 50Ω|$Z_1$|25Ω line was 35.35Ω. For convenience, an artificial impedance point of 35.35Ω was constructed for the compensated power divider. Hence, for this case, the 50Ω segment is to be matched to the 35.35Ω segment and the 25Ω segment is to be matched to 35.35Ω segment as shown in FIG. 13. For this analysis, any reasonable artificial impedance point can be chosen and the 50Ω and 25Ω impedance values matched to it. The 29.7Ω segment is just the parallel combination of the two 59.4Ω segments shown in FIG. 5(*b*). The quarter wave rule can then be used to verify the impedance values for the multi-segmented power divider as shown below, $$Z_1=(50\Omega \times 35.35\Omega)^{1/2}=42.04\Omega, \quad (17)$$

where 50Ω is matched to the artificially constructed impedance point 35.35Ω and, $$Z_2=(35.35\Omega \times 25\Omega)^{1/2}=29.7\Omega, \quad (18)$$

where the 25Ω point is matched to the artificially constructed impedance point 35.35Ω and $y_1=Z_2/Z_3$, $y_2=Z_1/Z_3$. The normalized OAD for the compensated power divider is shown in FIG. 14.

To verify that the addition of the quarter wave section in the front of the power divider junction does indeed broaden the frequency response, analysis of the compensated Wilkinson power divider using the normalized impedance, will now be performed with the aid of the OAD.

Figure 14:
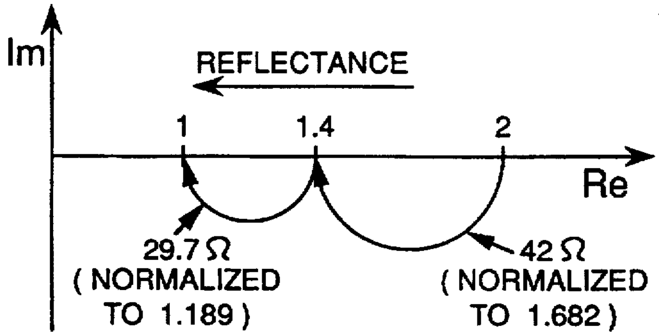
FIG. 14 illustrates the representation of the Compensated Wilkinson power divider as plotted on the normalized Optical Admittance Diagram with a design wavelength $\lambda_d$=40 cm and an excitation wavelength $\lambda_e$=40 cm. Both semicircles represent 10 cm long circuit elements even though one is 29.7Ω and the other is 42Ω.
Figure 15:
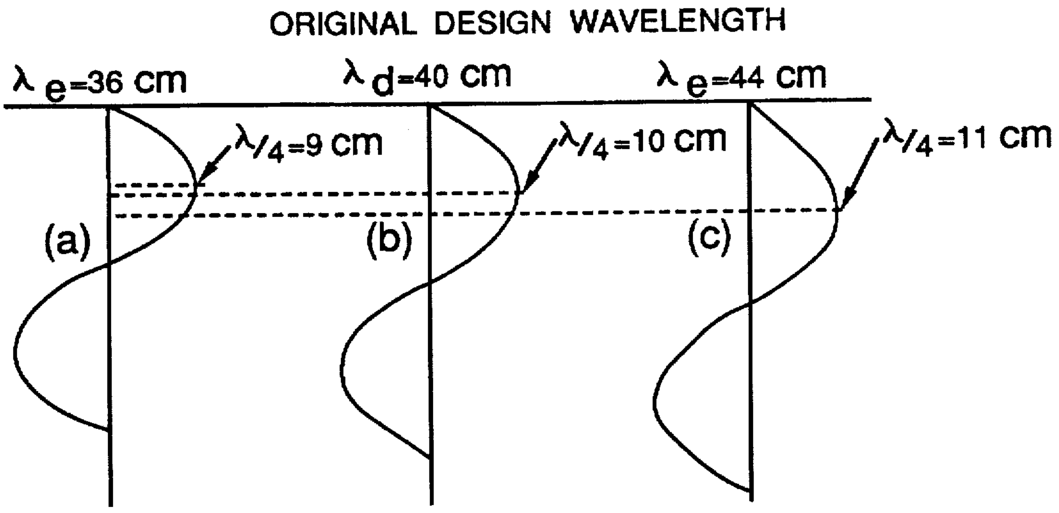
FIG. 15 illustrates the three wavelengths.

Representation on the OAD for the compensated power divider is shown in FIG. 14. For this analysis, let us pick a design wavelength $\lambda_d$ of approximately 0.75 GHz. This represents a wavelength $\lambda_d$ of approximately 40 cm and is shown in FIG. 15(*b*). A quarter wave stripline segment is 10 cm long, ignoring wavelength shifts in the stripline due to material properties. For actual microwave stripline circuits, the impedance is controlled by varying the strip thickness, width, properties of the metal used and the constants of the dielectric material. For this stripline circuit 25Ω was used as the normalization impedance. FIG. 14 shows that the high impedance of the first normalized stripline segment starts at the 2 point and is matched to the low impedance stripline segment at the 1 point by two quarter wave stripline segments. These segments match the center 1.414 point to the outer points 1 and 2. Using equation 13 the first segment was normalized to 1.682 and performs the match from the 2 point to the 1.414 point. Similarly, the second segment has a normalized value of 1.189 and performs the match from the 1.414 point to the 1 point.

It is important to note that both of the clockwise semicircles in FIG. 14 represent microwave stripline segments that are 10 cm long because they are quarter wave segments at the design wavelength, $\lambda_d$=40 cm. What we want to know is, "What happens when we are not at the design wavelength due to a shift in signal input frequency?" For this example, let us say that the excitation wavelength has shifted to $\lambda_e$=36 cm. This represents a quarter wave of 9 cm as shown in FIG. 15(*a*). Shown in FIG. 16 is the OAD for the same stripline circuit as before but with a shorter excitation wavelength, FIG. 15(*a*). At first glance, one might expect the semicircles to be shorter for a shorter wavelength. However, remember that the stripline circuit was designed for a quarter wave of 10 cm. The OAD shows the circuit with the wavelength in use, which is now 9 cm. Hence, a 9 cm stripline segment would be represented by one complete clockwise semicircle. Our segment is 10 cm long. This is represented by the clockwise extension of the semicircle beyond the horizontal axis due to the additional 1 cm section. It should be noted here that the length of the additional arc of the circle is not a linear function of the segment length. The eighth wavelength points are also shown in FIG. 16.

Since the segment represented by the first semicircle is longer than the excitation wavelength by 1 cm, we do not get a good match to the center point at our shifted wavelength. We see that the next semicircle, a consequence of the second segment, begins at the end of the previous semicircle, and is also too long for the same reason. This is clearly shown by the optical admittance diagram in FIG. 16. The quarter wave is 9 cm and our segment is 10 cm long. The result is that each portion of the semicircle above the horizontal axis effectively compenstes for each other. The second semicircle intersects the horizontal axis very close to the desired value of 1. The shift in the end point of the second semicircle is primarily along the horizontal. This indicates that only a slight phase shift will be introduced. It may also be noted that at this new wavelength, the intersection point of the two semicircles is above the horizontal axis and here, where it is not important, there is a phase shift.

Similar arguments could be made if we were to now pick a longer excitation wavelength $\lambda_e$=44 cm which is shown in FIG. 15(*c*), with a quarter wave of 11 cm. In that case the first semicircle would fall short of reaching the horizontal axis due to the 1 cm difference between the design quarter wave and the signal quarter wave as shown in FIG. 17. The second semicircle would also be short, but since it begins below the horizontal axis it also intersects the horizontal axis very close to the design impedance point, again showing that the original design is compensated for longer wavelengths. The frequency band of operation has indeed been broadened using this technique. While the exact values for center and final impedance points have not been calculated, they can be calculated by the interested designer. The important point here is to recognize how easy it is to perform simple analysis that provides a high degree of insight into the basic performance of a final microwave stripline circuit such as the Compensated Wilkinson power divider that the MOT Method was applied to for this invention as shown in FIG. 18.

The Wilkinson power divider discussed previously can also be improved by the addition of a half wave segment, or half wave flattening layer. A broader frequency band and zero reflectance may be accomplished by adding two quarter wave segments of higher impedance ($Z_H$=75Ω for example). However, this alternate design is beyond the scope of this paper and will be addressed in subsequent publications.

It will be apparent to persons skilled in the art that this invention is subject to various modification and adaptations. It is intended, therefore that the scope of the invention be limited only by the following claims.

We claim:

1. A process for designing a microwave circuit made up of microwave components, said process comprising the steps of:

defining all of said microwave components in terms of their equivalent electrical components;

combining all parallel electrical components into a series equivalent electrical component;

transforming the series equivalent electrical circuit into equivalent quarter wave optical thin film layers to make a stack with characteristic design parameters that are determined by observing plotted equivalent quarter wave optical thin film layer characteristics on an optical admittance diagram;

producing a modified plot on the optical admittance diagram modifying all plotted values on the optical admittance diagram to achieve desired characteristic design parameters; and performing a reverse transformation to design the microwave circuit composed of the microwave components directly from the modified plot on the optical admittance diagram, by transforming the modified plot on the optical admittance diagram into an equivalent microwave circuit composed of parallel microwave components.

2. A process as defined in claim 1, which further comprises a step of physically constructing the microwave circuit and microwave components using automatic photo-etching techniques and machining techniques for fabrication of aluminum plates to house photo-etched circuit and connectors for testing to verify design results.

3. A process of fabricating a microwave circuit composed of microwave components, said process comprising the steps of:

defining all of said microwave components in terms of their equivalent components;

combining all parallel electrical components into series equivalent electrical components to create thereby a series equivalent electrical circuit;

a first transforming step which entails transforming the series equivalent electrical circuit into a design for a set of equivalent quarter wave optical thin film layers;

plotting equivalent quarter wave optical thin film layer characteristics on an optical admittance diagram;

producing a modified plot on the optical admittance diagram modifying all plotted values on the optical admittance diagram to achieve desired characteristics;

performing a reverse transformation from the modified plot on the optical admittance diagram into a revised design of the set of equivalent quarter wave optical thin film layers;

a second transforming step that entails transforming the revised design of the set of equivalent quarter wave optical thin layers into a final design of an equivalent microwave circuit composed of parallel microwave components; and physically constructing the final design of the microwave circuit and microwave components using automaticphoto-etching techniques and machining techniques.

4. A process, as defined in claim 3, wherein said producing substep comprises:

determining properties of perturbational frequency (δv) behavior (small changes in frequency) by analyzing the optical admittance diagram by observing variational admittance changes (δy/δv) with small variations frequency and variational phase shift changes (δφ/δv) with small variations in frequency and variational E-Field changes (δE/δv) with small variations frequency; any other optical properties that are pertinent and then;

expressing the variations in terms of microwave parameters so that the behavior of the final design is ascertained.

* * * * *